(12) United States Patent
Breuer et al.

(10) Patent No.: US 7,038,401 B2
(45) Date of Patent: May 2, 2006

(54) OPERATING DEVICE AND METHOD FOR OPERATING GAS DISCHARGE LAMPS

(75) Inventors: Christian Breuer, München (DE); Andreas Huber, Maisach (DE); Ralf Weidemann, Stahnsdorf (DE)

(73) Assignee: Patent Treuhand Gesellschaft fur elektrische Gluhlampen mbH, Munich (DE)

( * ) Notice: Subject to any disclaimer, the term of this patent is extended or adjusted under 35 U.S.C. 154(b) by 0 days.

(21) Appl. No.: 10/830,048

(22) Filed: Apr. 23, 2004

(65) Prior Publication Data

US 2004/0217717 A1    Nov. 4, 2004

(30) Foreign Application Priority Data

May 2, 2003    (DE) ............... 103 19 950

(51) Int. Cl.
*H05B 37/02*    (2006.01)
(52) U.S. Cl. .................. 315/291; 315/307; 315/308
(58) Field of Classification Search ........... 315/209 R, 315/224, 244, DIG. 7, 291, 307, 308
See application file for complete search history.

(56) References Cited

U.S. PATENT DOCUMENTS

| | | | |
|---|---|---|---|
| 5,083,065 A | 1/1992 | Sakata et al. ............... 315/307 |
| 5,481,163 A | 1/1996 | Nakamura et al. .......... 315/308 |
| 5,608,294 A | 3/1997 | Derra et al. ................. 315/308 |
| 5,623,187 A * | 4/1997 | Caldeira et al. ............ 315/307 |
| 5,907,742 A | 5/1999 | Johnson et al. ............. 399/51 |
| 6,051,939 A | 4/2000 | Eckert ......................... 315/307 |
| 6,153,987 A | 11/2000 | Toda et al. .................. 315/308 |
| 6,316,886 B1 * | 11/2001 | Luger et al. ................ 315/307 |
| 6,552,500 B1 * | 4/2003 | Tyson .......................... 315/291 |
| 6,586,892 B1 | 7/2003 | Derra et al. ................. 315/307 |
| 6,850,015 B1 * | 2/2005 | Ishizuka et al. ............ 315/224 |

FOREIGN PATENT DOCUMENTS

| DE | 100 21 537 | 11/2001 |
| WO | WO 95/35645 | 12/1995 |

OTHER PUBLICATIONS

Copy of Search Report (3 pages) for corresponding European application; search report was issued by the European Patent Office on Jan. 25, 2005.

* cited by examiner

*Primary Examiner*—Tuyet Vo
*Assistant Examiner*—Jimmy Vu

(57) ABSTRACT

The ignition of a gas discharge lamp is followed by a warm-up phase. During warm-up, sufficient power must be converted to enable the lamp to transition to an operating phase. This causes currents flowing at a damaging level into the electrodes in known devices. These high currents are avoided using: a regulation device that regulates the power of connected gas discharge lamps to a desired power; a setting device that limits a lamp current of connected gas discharge lamps to a limit value; a detection device that outputs a signal to the control device if a limit value setting is too low, putting a connected lamp into a state in which the lamp assumes the desired power; and a control device prescribing the limit value for the setting device and increasing the limit value if the detection device sends a signal to the control device.

6 Claims, 3 Drawing Sheets

OPERATING DEVICE AND METHOD FOR OPERATING GAS DISCHARGE LAMPS

FIELD OF THE INVENTION

The invention relates to an operating device and a method for operating gas discharge lamps with electrodes. In particular, the invention solves problems that occur during warm-up of gas discharge lamps.

BACKGROUND OF THE INVENTION

Gas discharge lamps have to be ignited by means of a high voltage. After ignition, the lamp warms up from a starting temperature to an operating temperature during a warm-up phase. The voltage present across the gas discharge lamp after the ignition is termed the arc voltage and is substantially independent of the lamp current within wide limits. The arc voltage rises during the warm-up phase from a starting arc voltage up to an operating arc voltage. The warm-up phase is followed by an operating phase in properly functioning gas discharge lamps.

A distinction is made between high-pressure and low-pressure gas discharge lamps in lamp technology. With high-pressure gas discharge lamps, also termed lamps below, it is essential for the mode of operation that the pressure in the lamp vessel rises during the warm-up phase from an initial pressure up to an operating pressure. This is one reason why the invention described below can be used with particular advantage with high-pressure gas discharge lamps. However, it can also be used with low-pressure gas discharge lamps.

It is customary during the operating phase for the operating device to regulate the power of the lamp to a desired power. Since the arc voltage is low during the warm-up phase, in the case of pure power regulation a high lamp current would be required during the warm-up phase in order to set the desired power. This current can be higher by a multiple than the lamp current during the operating phase. This would lead to a destruction of the lamp electrodes. Consequently, in the prior art the current supplied to the lamp by the operating device during the warm-up phase is limited to a constant warm-up current. The lamp is therefore fed with the constant warm-up current at least during a first segment of the warm-up phase. The arc voltage rises in the course of the warm-up phase. Once the arc voltage has reached a value that yields the desired power in conjunction with the constant current, the power regulation begins to operate. As the arc voltage rises further, the lamp current is reduced so far by the power regulation that the desired power is established. The warm-up phase is concluded when the arc voltage has reached the value of the operating arc voltage. The operating arc voltage exhibits manufacturing tolerances and also changes during the service life of a lamp. The operating arc voltage is therefore defined by the arc voltage that remains substantially constant during a time range given the desired power. The time range to be considered is one minute, for example. Correlated with the operating arc voltage is an operating lamp current that yields the desired power together with the operating arc voltage.

The following is to be noted for the value of the warm-up current: during the warm-up phase, it is necessary to couple so much power into the lamp that the pressure in the lamp, and thus the lamp voltage, rises steadily until the operating arc voltage is reached. Otherwise, the case can arise that the lamp persists in a stable state during the warm-up phase, and the desired power is not reached. In order to exclude this case reliably, a warm-up current is selected in the prior art that is substantially above the operating lamp current. This is described in document U.S. Pat. No. 5,083,065 (Sakata). One aspect in the selection of the warm-up current is also the desire for the shortest possible warm-up phase in order to reach a desired luminous flux in the shortest possible time.

However, a high warm-up current constitutes a heavy load on the electrodes, and this causes damage to the electrodes and therefore reduces the lamp service life. The electrodes are damaged either by overheating, which causes fusing and erosion, or by so-called sputtering, which is caused by ions that strike an electrode at high speed.

SUMMARY OF THE INVENTION

It is an object of the present invention to provide an operating device and a method for operating gas discharge lamps that has a warm-up phase that, on the one hand, ensures that the lamp is led into an operating phase, and on the other hand effects a minimum load on the electrodes.

This object is achieved by means of an operating device for operating gas discharge lamps that has the following features:

a regulation device which is suitable for regulating the power of connected gas discharge lamps to a desired power, a setting device that is suitable for limiting a lamp current of connected gas discharge lamps to a limit value, a detection device designed to output a signal to the control device if a limit value setting is too low, in order to put a connected lamp into a state in which the lamp assumes the desired power, and the control device is designed such that it prescribes the limit value for the setting device and increases the limit value if the detection device sends a signal to the control device.

Particularly advantageous refinements of the invention are to be found in the dependent claims.

Particularly in the case of so-called ultra-high-pressure lamps, which are used predominantly in projection applications such as beamers, for example, it has proved that the fine structure of the electrode surface has a substantial influence on the service life and the flickering of the lamp. Such fine structures are described in document DE 100 21 537 (Derra). These fine structures are produced either during fabrication of the lamp, or they result from operating the lamp during the operating phase in a way suitable therefor. The invention described here prevents the so-called fine structures from being destroyed in the warm-up phase by an excessive warm-up current.

According to the invention, the warm-up phase begins with a low warm-up current whose value is selected so as to exclude damage to the electrodes of a connected lamp. If no state of the lamp in which the lamp assumes the desired power is reached with the initially set warm-up current, the warm-up current is increased in accordance with the invention.

BRIEF DESCRIPTION OF THE DRAWINGS

The aim below is to explain the invention in more detail with the aid of exemplary embodiments and with reference to drawings, in which.

DETAILED DESCRIPTION OF THE INVENTION

Figure 1:
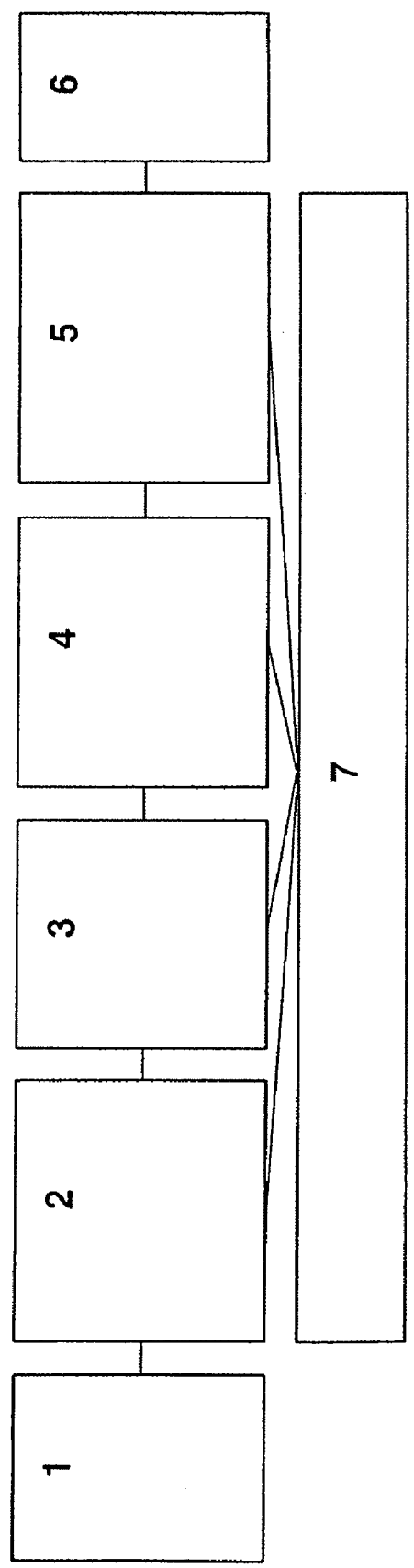
FIG. 1 shows a block diagram of an exemplary embodiment for an inventive operating device.

FIG. 1 constitutes a block diagram of an exemplary embodiment of an inventive operating device that is suitable for operating high-pressure gas discharge lamps. The basic design and the basic mode of operation of such an operating device are described in document WO 95/35645 (Derra). The individual blocks are described briefly below.

Block 1 includes a dc voltage supply that draws its energy in general from a line voltage supply. The value of the dc voltage supplied is above the arc voltage of a connected lamp 6.

The dc voltage supply feeds a step-down converter 2 that transforms the voltage value supplied by the dc supply voltage downward to a value corresponding to the arc voltage of a connected lamp 6. The step-down converter 2 includes a setting device with the aid of which the lamp current can be set. This is done by selecting the voltage that is set at the output of the step-down converter.

A possibility of setting exists mostly owing to a so-called pulse width modulation (PWM). This determines the ratio of switched-on to switched-off duration of electronic switches that are included in the step-down converter 2.

The design of the step-down converter 2 can be taken from the general literature on power electronics. A topology with a switch is selected in WO 95/35645 (Derra). Also possible, however, is a design with several switches such as is represented by a half bridge, for example. The step-down converter 2 includes an inductor that serves for limiting current. The step-down converter 2 is thus lent a characteristic that corresponds to an adjustable current source for the lamp current.

The step-down converter 2 supplies a direct current or an alternating current depending on the topology selected. For the case in which the step-down converter 2 supplies an alternating current, the output of the step-down converter 2 is fed into a rectifier 3 that supplies a direct current at its output. The rectifier 3 can be omitted if the step-down converter 2 supplies a direct current.

The direct current from the rectifier 3 or the step-down converter 2 is fed into a full bridge 4 that transforms the direct current into a rectangular alternating current. The frequency of the rectangular alternating current is low by comparison with customary frequencies at which the step-down converter 2 operates, and is at values of between 50 Hz and 1 kHz.

The transformation into a rectangular alternating current is required with applications that operate alternating current lamps and require a uniform luminous flux. Examples for such applications are beamers and back projection television sets. The inventive warm-up of the lamp in a way protecting the electrodes can also, however, be applied to dc lamps or to ac lamps that are operated with non-rectangular alternating current. Consequently, block 3 or 4 or both, can be eliminated depending on application.

Connected between the full bridge 4 and the lamp 6 is an ignition unit 5 that supplies the voltage required to ignite the lamp. After the ignition of the lamp, the ignition unit 5 normally assumes no further function.

A monitoring unit 7 is connected to the step-down converter 2, the rectifier 3, the full bridge 4 and the ignition unit 5. The monitoring unit 7 includes the control device, the regulation device, the detection device and measuring devices for detecting operating parameters (for example arc voltage, lamp current), and a device for storing lamp-specific data and characteristic curves. The individual devices are combined in the monitoring unit 7, since the monitoring unit 7 mostly includes a microcontroller that combines in itself the function of several or all devices. In many cases, it is also possible to implement a device either by means of hardware or by means of software. Control and regulation tasks are increasingly being taken over by software, since this solution is cost-effective and flexible.

All connections that lead to the monitoring device 7 can both be inputs and outputs. When connected as inputs, the connections can feed information on the arc voltage and on the lamp current from one of the blocks 2–5 of the monitoring unit 7 in any way desired.

When connected as outputs, the connections control ignition, warm-up, operation and disconnection of the operating device in a fashion coordinated by the monitoring unit 7.

The regulation device, which is included in the monitoring unit 7, uses the lamp current and the arc voltage to calculate the lamp power, and compares it with a stored desired power for the lamp that is to be operated. If the lamp power is lower than the desired power, the control device then increases the lamp current via the setting device until the lamp power and desired power correspond.

For a warm-up according to the invention, the control device, which is included in the monitoring unit 7, uses a setting device that is included in the step-down converter 2 firstly to set a limit value for the lamp current after ignition. The lamp is in the warm-up phase, and so the lamp current in this phase is also termed warm-up current. According to the invention, the limit value is selected so as to exclude damage to the electrodes. The limit value depends on the lamp that is to be operated. The value that is mostly determined from test series is stored in the monitoring unit 7.

The limit value can be constant during the warm-up phase, thus enabling a simple implementation. However, it has been shown that the warm-up can be optimized with reference to the loading of the electrodes and the stability of the plasma arc of the lamp when the limit value for the lamp current is selected as a function of the arc voltage. The optimum dependence is determined in tests and stored in the form of a characteristic curve in the monitoring unit 7.

Thus, the monitoring unit 7 uses a measuring device firstly to determine the arc voltage, and sets the associated optimum limit value for the lamp current. In the course of the warm-up phase, the arc voltage continues to increase, and in the ideal case reaches a value that leads to a lamp power that corresponds to the desired power, and the lamp finally makes the transition to the operating phase. A change in the constant limit value, or that prescribed by the stored characteristic curve, is not required in this ideal case.

As low as possible a limit value is selected, however, in order to spare the electrodes, and can lead to a case that deviates from the ideal case. The power that is converted in the lamp in the non-ideal case is so low that the arc voltage does not rise so far that the desired power is reached in the lamp. Rather, the arc voltage persists at one value and rises no more.

According to the invention, a detection device detects this case and signals the control device. The latter causes an increase in the limit value, whereupon the arc voltage begins to rise again. A single increase in the limit value is mostly sufficient to lead the lamp into the operating phase. However, it is also possible for the detection device to detect repeatedly that the lamp will not reach the desired power and to trigger a further increase in the limit value via a signal to the control device.

An increase in the limit value can be set up in such a way that the control device prescribes a higher constant limit value for the setting device starting from a constant limit value. This solution can be implemented simply.

In order to ensure that the lamp can make a transition into the operating phase after the first reception of a signal from the detection device, after the first reception of a signal of the detection device the control device can also be designed such that it prescribes a limit value rising in steps or continuously for the setting device.

As described above, control devices are also possible in which the limit value is a function of the arc voltage via a stored characteristic curve. In the case of such a control device, a signal from the detection device triggers a deviation from the stored characteristic curve. The monitoring unit 7 can have several stored characteristic curves, one being switched to active in each case and being valid for the control device. The warm-up phase is started with the characteristic curve that has the lowest limit values. Upon reception of a signal from the detection device, the control device switches to active a further characteristic curve, which has higher limit values. Although this implementation of the present invention is more complicated than respectively setting constant limit values, it does enable the lamp to be warmed up in optimum fashion as with the aid of test series that have been carried out with the relevant lamp. Use is made of the following as criteria therefor:

least possible damage to the electrodes, and thus a maximum service life, short warm-up phase, and stability of the plasma arc in the lamp.

There are several design possibilities for the detection device:

In a simple design of the detection device, a time measuring device measures the time that has elapsed from the start of the warm-up phase. After a preset time, the detection device outputs a signal to the control device. The preset time is generally determined by test series with the lamp to be operated. If the lamp has not yet reached the desired power after the preset time, the control device renders a higher limit value effective. If the lamp has already reached the desired power after the preset time, the control device would certainly permit a higher lamp current, but the regulation device sets a lamp current that yields the desired power in conjunction with the arc voltage.

A further design possibility for the detection device consists in the detection device detecting the rise in arc voltage. The faster the arc voltage rises, the greater is the probability of the lamp making the transition to the operating phase. As soon as a rise in the arc voltage is below a prescribed value, the detection device sends a signal to the control device. The prescribed value for the rise in the arc voltage is determined as a rule by means of test series with the lamp to be operated. By comparison with the first described design of the detection device, the second design has the advantage that it can detect earlier that a set limit value is too low, and can thus shorten the warm-up phase.

Figure 2:
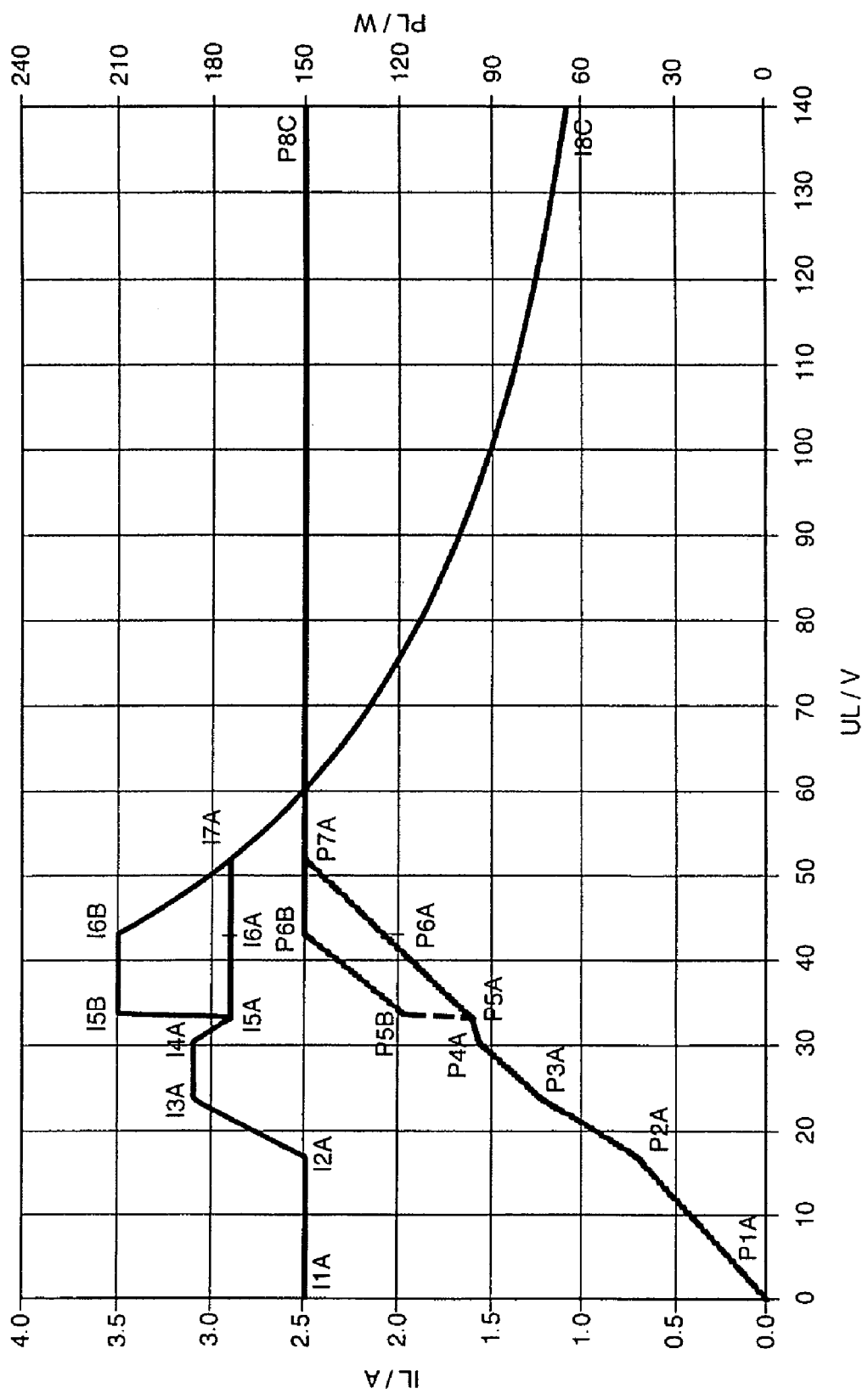
FIG. 2 shows a diagram that illustrates the dependence of the lamp current and the lamp power on the arc voltage given a different warm-up behavior.

Illustrated in FIG. 2 by way of example is a diagram that shows the dependence of the lamp current and the lamp power on the arc voltage. Two cases with different warm-up behavior are illustrated, under the control of two different characteristic curves.

The arc voltage UL in volts in specified on the abscissa. The lamp current IL in amperes is specified on the left-hand ordinate, and the lamp power PL in watts is specified on the right-hand ordinate.

The dependence of the lamp current on the arc voltage will be explained first. Starting at an arc voltage of from 0 V up to approximately 17 V, a stored characteristic curve A for the lamp current prescribes a constant limit value of 2.5 A. This is described by the characteristic curve segment between the points I1A and I2A. If the arc voltage at the point I2A rises above a value of approximately 17 V, the limit value increases linearly up to 3.2 A until the arc voltage reaches 23 V at the point I3A. The limit value remains constant at 3.2 A from 23 V to 30 V. Above an arc voltage of 30 V, at the point I4A the limit value is once again taken back linearly down to a limit value of 2.8 A at 32 V at the point I5A. The fact that the limit value is exceeded in the range between 22 V and 32 V serves to stabilize the plasma arc of the lamp.

If, when the point I5A is reached, the detection device has not yet sent a signal to the control device, the characteristic curve A continues to remain valid. Beyond the point I6A up to the point I7A between an arc voltage of 32 V and 53.5 V, the limit value remains constant at a value of 2.8 A. At the point I7A, a state is reached in which the lamp adopts the desired power of approximately 150 W. If the arc voltage continues to rise, the lamp current is no longer determined by the limit value prescribed by the characteristic curve A, but it follows the hyperbola for constant power that is specified up to the point I8C for an arc voltage of 140 V.

High arc voltages are an indication of lamps that are near the end of their service life. Consequently, the operating devices under discussion mostly have a prescribed threshold voltage for the arc voltage. The operating device switches off if this threshold value is exceeded over a lengthy time.

The characteristic curve splits at the point I5A. In the example according to FIG. 2, it is now assumed that the detection device sends a signal to the control device at the instant when the arc voltage has reached the point I5A. A characteristic curve B is thereby activated. In accordance with the characteristic curve B, the limit value for an arc voltage of 32 V is 3.5 A, for which reason there is a jump from the point I5A to the point I5B. In accordance with the characteristic curve B, the limit value is 3.5 A irrespective of the arc voltage. If the arc voltage continues to rise along the characteristic curve B, it meets at approximately 43 V the hyperbola for constant power at the point I6B at which, as described above, the power regulation begins to be effective.

In the example shown, without a switchover at the point 15A from the characteristic curve A to the characteristic curve B the arc voltage would no longer have risen substantially above 32 V. The lamp would not have reached the hyperbola for constant power, and would therefore not have reached the desired power.

The lamp power associated with the lamp currents at the points for the characteristic curve A (I1A to I7A) is shown by the points P1A to P7A. The points P5B and P6B show the lamp powers at the corresponding points 15B and 16B on the characteristic curve B. Once the lamp current reaches the hyperbola for constant power, the graph for the lamp power remains constant up to the point P8C.

Figure 3:
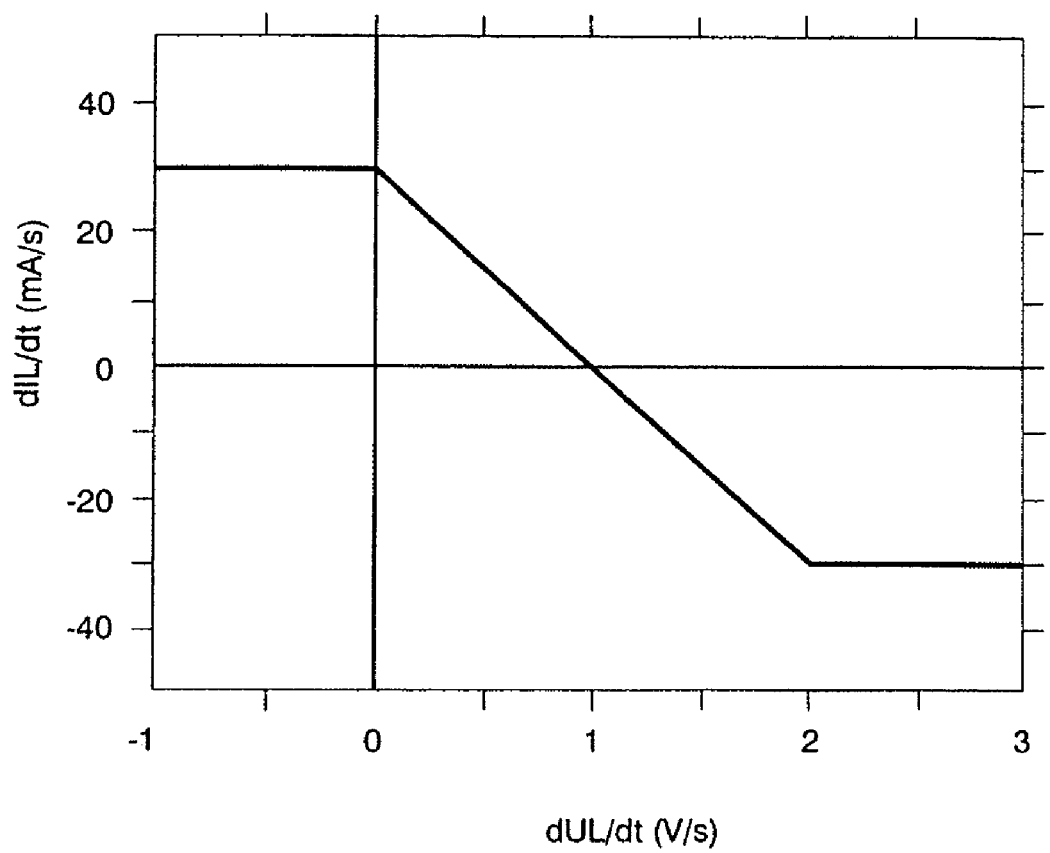
FIG. 3 shows a diagram that illustrates the dependence of the change in lamp current over time on the change in arc voltage over time.

FIG. 3 illustrates an example of how the change in the arc voltage with time is evaluated via the detection device, and effects a change in the lamp current via the control device.

Plotted on the abscissa is the change in the arc voltage with time, which is evaluated by the detection device. Plotted on the ordinate is the change in lamp current with time, which is effected by the control device for the corresponding change in the arc voltage.

It is to be gathered from the example according to FIG. 3 that in the warm-up phase the lamp current is increased by 30 mA per second if the arc voltage does not change. The lamp current is left at the instantaneous value if the arc voltage increases by 1 volt per second. The lamp current is reduced by 30 mA per second if the arc voltage is increased by 2 volts per second.

A linear relationship between the change in arc voltage and the change in lamp voltage is prescribed in FIG. 3. However, nonlinear and discontinuous relationships are also conceivable.

If the arc voltage drops or rises more quickly than 2 volts per second, a maximum change of 30 mA per second is prescribed, rising in the first case and falling in the second case. Depending on lamp type and application, the maximum change can differ from 30 mA per second.

The invention claimed is:

1. An operating device for operating gas discharge lamps, comprising:
   a regulation device for regulating the power of connected gas discharge lamps to a desired power;
   a setting device for limiting a lamp current of connected gas discharge lamps to a limit value;
   a detection device designed to output a signal to the control device if a limit value setting is too low, in order to put a connected gas discharge lamp into a state in which the lamp assumes the desired power; and
   a control device that prescribes the limit value for the setting device and increases the limit value if the detection device sends a signal to the control device, wherein the control device detects an arc voltage via a measuring device and sets the limit value as a function of the arc voltage by means of a stored characteristic curve.

2. The operating device of claim 1, wherein the control device activates a further stored characteristic curve upon receiving a signal from the detection device.

3. An operating device for operating gas discharge lamps, comprising:
   a regulation device for regulating the power of connected gas discharge lamps to a desired power;
   a setting device for limiting a lamp current of connected gas discharge lamps to a limit value;
   a detection device designed to output a signal to the control device if a limit value setting is too low, in order to put a connected gas discharge lamp into a state in which the lamp assumes the desired power, wherein the detection device includes a time measuring device which sends a signal to the control device after expiry of a prescribed time following ignition of a connected gas discharge lamp; and
   a control device that prescribes the limit value for the setting device and increases the limit value if the detection device sends a signal to the control device.

4. An operating device for operating gas discharge lamps, comprising:
   a regulation device for regulating the power of connected gas discharge lamps to a desired power;
   a setting device for limiting a lamp current of connected gas discharge lamps to a limit value;
   a detection device designed to output a signal to the control device if a limit value setting is too low, in order to put a connected gas discharge lamp into a state in which the lamp assumes the desired power, wherein the detection device detects the rise in an arc voltage via a measuring device and sends a signal to the control device if the rise is below a prescribed value; and
   a control device that prescribes the limit value for the setting device and increases the limit value if the detection device sends a signal to the control device.

5. A method for operating gas discharge lamps, the method comprising the steps of:
   setting, after ignition of the gas discharge lamp, a warm-up lamp current that is selected to be so low that electrodes of a connected gas discharge lamp are not damaged, wherein the warm-up lamp current is set as a function of an arc voltage, this dependence being adopted from a stored characteristic curve;
   detecting whether the set warm-up lamp current puts the gas discharge lamp into a state in which the gas discharge lamp assumes the desired power; and
   raising the warm-up lamp current in the case when it is detected that the set warm-up lamp current does not suffice to put the gas discharge lamp into a state in which it assumes the desired power.

6. The method as claimed in claim 5, wherein the step of raising the warm-up lamp current is achieved by switching over to a further stored characteristic curve.

* * * * *